United States Patent [19]

Yamamoto et al.

[11] Patent Number: 5,705,234
[45] Date of Patent: Jan. 6, 1998

[54] METHOD FOR MANUFACTURING MAGNETIC HARD DISK

[75] Inventors: Motokazu Yamamoto; Noriko Nakamura, both of Tokyo, Japan

[73] Assignee: Nihon Micro Coating Co., Ltd., Japan

[21] Appl. No.: 779,630

[22] Filed: Jan. 7, 1997

[30] Foreign Application Priority Data

Aug. 26, 1996 [JP] Japan .................................. 8-241023

[51] Int. Cl.[6] .................................................. H05H 1/32
[52] U.S. Cl. ........................ 427/540; 427/130; 427/131; 427/132; 427/404; 427/580; 428/65.3
[58] Field of Search .................................. 427/540, 130, 427/131, 132, 404, 580; 428/65.3

[56] References Cited

PUBLICATIONS

"Process of Structural Transformation of Electrodeposited Amorphous Ni–P Alloy by Heating", M. Yamamoto, et al., J. of Electrochemical Soc., vol. 138, No. 7, Jul., 1991.

*Primary Examiner*—Bernard Pianalto
*Attorney, Agent, or Firm*—Majestic Parsons Siebert & Hsue P.C.

[57] ABSTRACT

An object of the present invention is to provide a method for manufacturing a magnetic hard disk wherein a magnetic material layer adhered on a surface of a substrate of the magnetic hard disk has a flat surface.

A method for manufacturing a magnetic hard disk comprising steps of: structurally transforming a surface of an amorphous Ni—P alloy film layer formed a substrate (10) of the magnetic hard disk; and adhering a magnetic material layer on the surface of a substrate (10), wherein the step of structurally transforming the a-Ni—P alloy film layer is a step of heating only a desired portion of the surface of the substrate (10) by an electric discharge to generate Ni and crystallized compounds of Ni and P only at the desired portion (T) of the surface thereof. The electric discharge in the step of structurally transforming the a-Ni—P alloy film layer is carried out by applying a discharge potential between at least one electric discharger (11) and a metallic table (12) as an electrode which carries the substrate (10) thereon, the electric discharger (11) being positioned in opposite to the surface of the substrate (10).

3 Claims, 3 Drawing Sheets

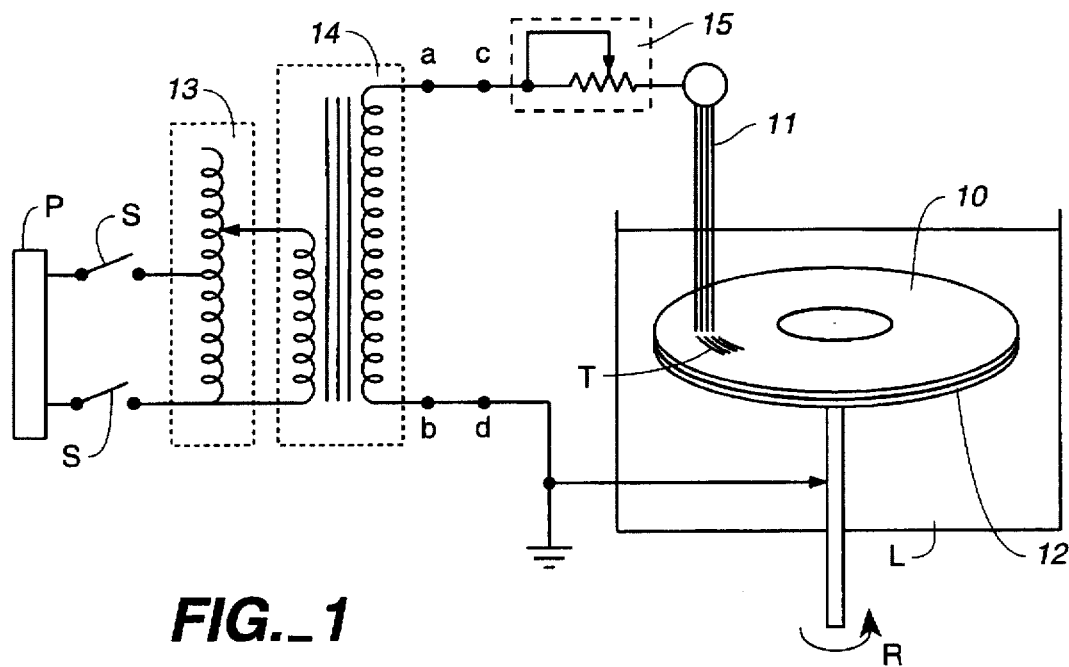
FIG._1
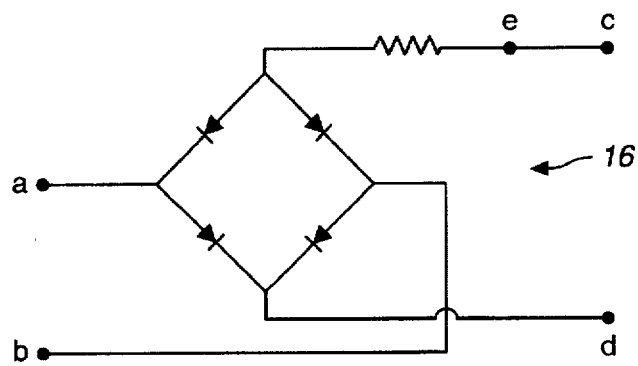
FIG._2A
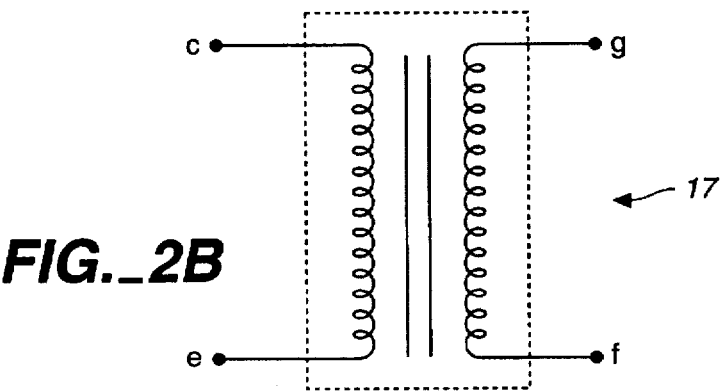
FIG._2B

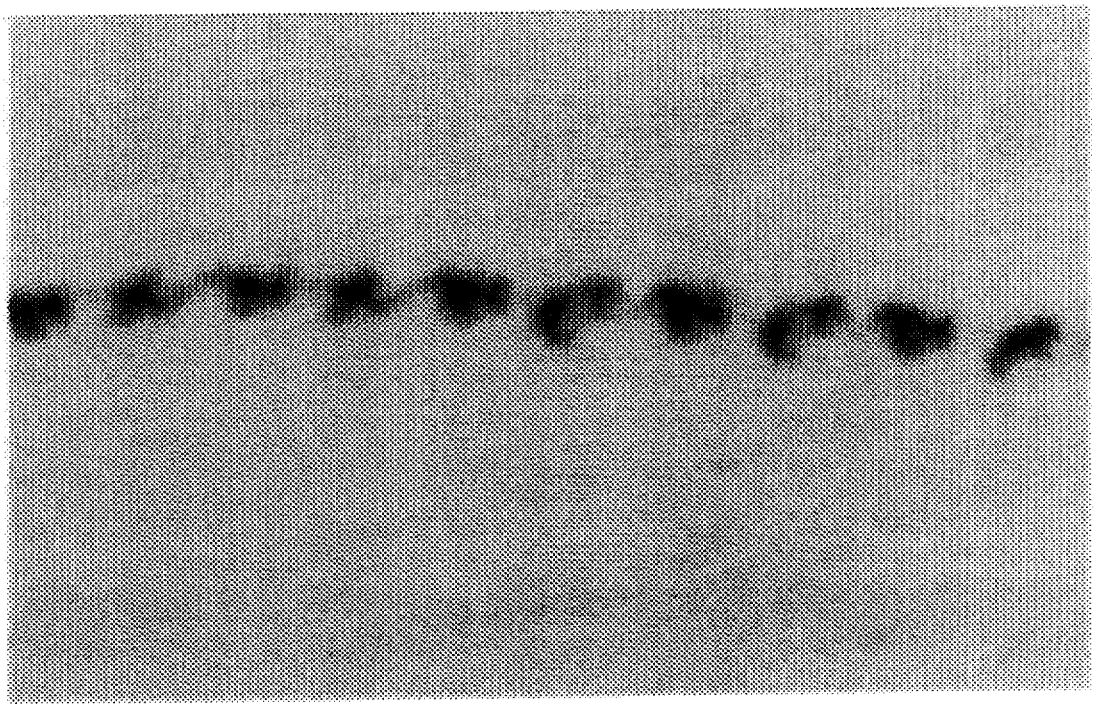
FIG._3A
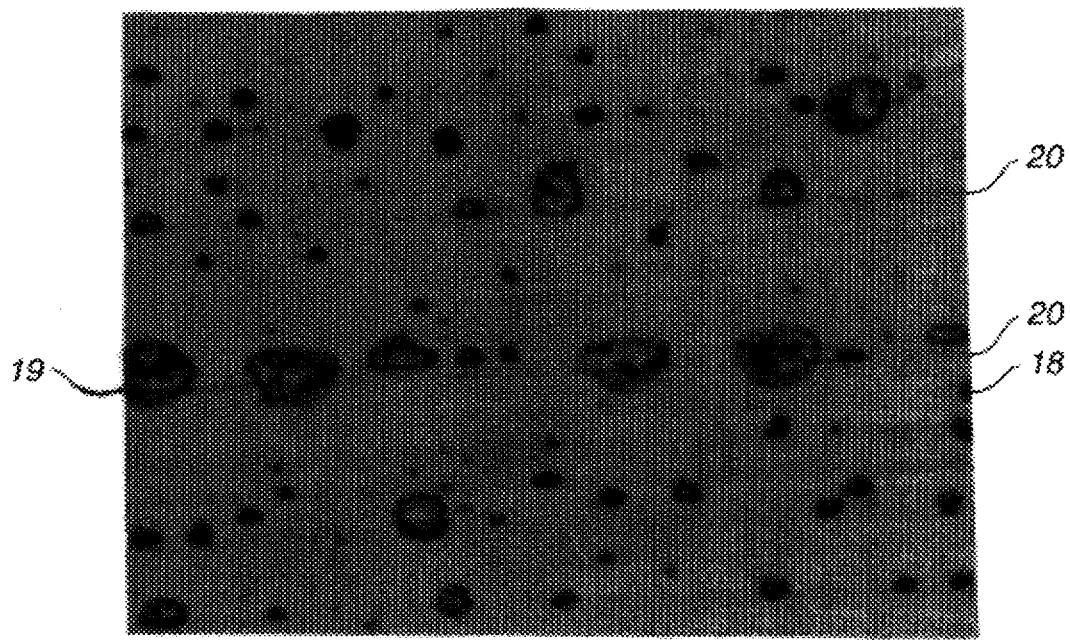
FIG._3B

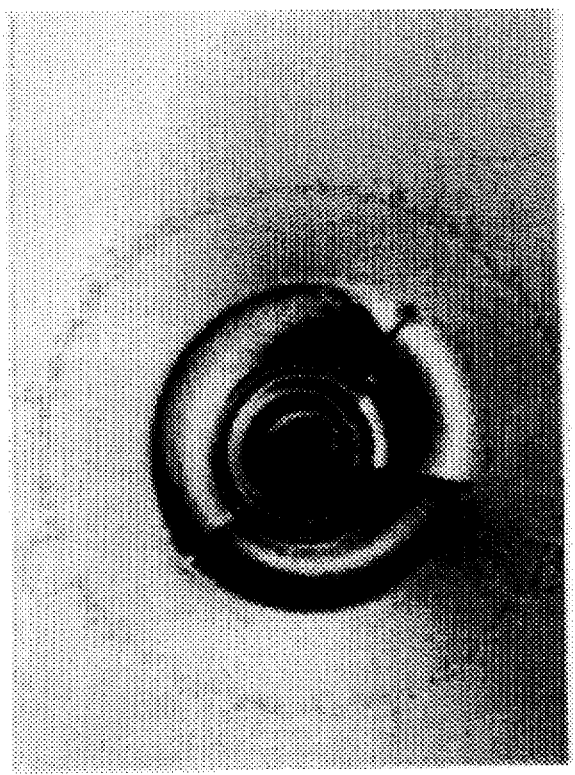
FIG._4A
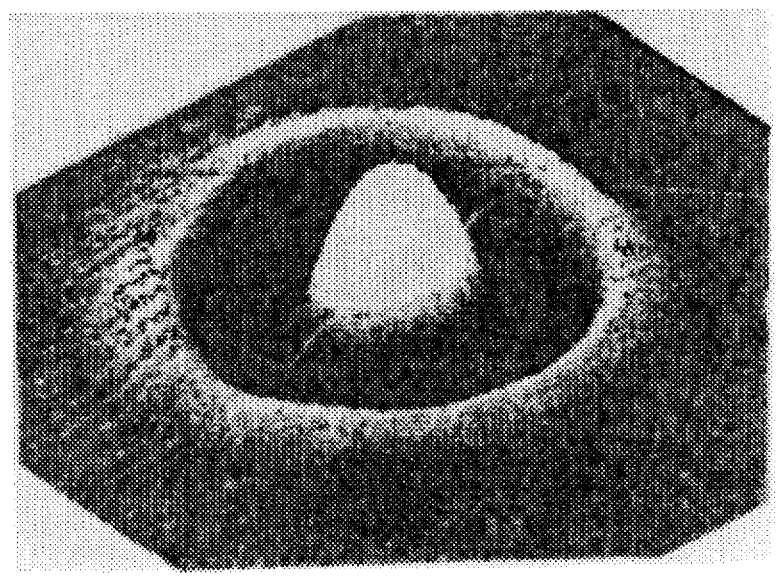
FIG._4B

METHOD FOR MANUFACTURING MAGNETIC HARD DISK

TECHNICAL FIELD

The present invention relates to a method for manufacturing a magnetic hard disk.

BACKGROUND OF THE ART

In general, it is known that an amorphous Ni—P (hereafter called as "a-Ni—P") alloy has high mechanical strength and anticorrosion and is a non-magnetic material. Since the a-Ni—P alloy has such properties, the a-Ni—P alloy is used as a reinforcement for a substrate of a magnetic hard disk made of aluminium by forming an a-Ni—P alloy film layer on the substrate by plating a-Ni—P alloy on the surface thereof.

A hard disk is manufactured by adhering a magnetic layer on a surface of the substrate (that is, this surface is a surface of the a-Ni—P alloy film layer as mentioned above) by sputtering.

However, the surface of the a-Ni—P alloy film layer is so flat that the magnetic layer adhered thereon can be easily separated from the surface of the substrate. Thus, in the art, irregularities are formed by carrying out a texture processing on the surface of the a-Ni—P alloy film layer by using abrasive particles and the like, so that a contact area between those surfaces can be increased. Also, crystallized compounds of Ni and P hereafter called as "crystallized $Ni_xP_y$") and Ni are generated locally on the surface of the a-N—P alloy film layer, so that the adhesion between the a-Ni—P alloy film layer and the substrate can be improved. Such crystallized $Ni_xP_y$ and Ni are generated locally thereon by heat produced by the texture processing (as referred to Japanese Patent Application No. Heisei 8(1996)-53711).

FIG. 3(b) is a microphotograph (×210) of a surface of a substrate of a magnetic hard disk carried out a texture processing of abrading on a surface of an a-Ni—P alloy film layer by using abrasive particles.

As seen in FIG. 3(b), on the surface of the a-Ni—P alloy film layer, Ni 18 and crystallized $Ni_xP_y$ 19 are generated along many grooves 20 formed by the abrasion.

Recently, the memory capacity of a magnetic hard disk has been required to be improved. For this, a distance between a magnetic head and a magnetic hard disk should be shorter and shorter.

However, when a magnetic material layer is adhered on the a-Ni—P alloy film layer carried out the texture processing as mentioned above, irregularities are formed on the magnetic material layer adhered on the surface of the a-Ni—P alloy film layer. This is because many grooves (as referred to number 20 in FIG. 3(b)) are formed on the a-Ni—P alloy film layer. A difference between the top and the bottom portions of the irregularities formed on the magnetic material layer is about 0.3 µm, and the top portions of the irregularities may be collieded with a magnetic head.

There is a technique to improve the adhesion between the a-Ni—P alloy film layer and the magnetic material layer without carrying out the texture processing as mentioned above. In this technique, the a-Ni—P alloy film layer is heated to generate crystallized $Ni_xP_y$ and Ni thereon and the surface of the a-Ni—P film alloy layer can be flat. However, according to this technique crystallized $Ni_xP_y$ and Ni are generated in the whole of the a-Ni—P alloy film layer, and as a result, the mechanical strength of the a-N—P alloy film layer is considerably reduced so that the a-Ni—P alloy film layer can not be used as a reinforcement.

In addition, there is another technique to form irregularities locally on the surface of the a-Ni—P alloy film layer. In this technique, a laser beam is radiated on the surface of the a-Ni—P alloy film layer. However, the life of a laser apparatus is too short and the cost of the process is too high to utilize this technique in practice.

Therefore, an object of the present invention is to provide a method for manufacturing a magnetic hard disk wherein a magnetic material layer adhered on a surface of a substrate of the magnetic hard disk has a flat surface.

SUMMARY OF THE INVENTION

A method for manufacturing a magnetic hard disk, in accordance with the present invention, comprises steps of:

(1) structurally transforming a surface of an a-Ni—P alloy film layer formed a substrate of the magnetic hard disk; and (2) adhering a magnetic material layer on a surface of the substrate of the magnetic hard disk (that is, the surface of the a-Ni—P alloy film layer), wherein the step of structurally transforming the a-Ni—P alloy film layer formed the substrate of the magnetic hard disk is a step of heating only a desired portion of the surface of the substrate by an electric discharge to generate Ni and crystallized $Ni_xP_y$ only at the desired portion of the surface thereof.

That is, the present invention is characterized in that a desired portion of the surface of the a-Ni—P alloy film layer formed the substrate is structurally transformed locally, and a magnetic material layer is then adhered on the surface of the substrate.

This structural transformation is carried out by heating the surface of the a-Ni—P alloy film layer by an electric discharge so that crystallized $Ni_xP_y$ and Ni are generated on the surface thereof.

The heating of the surface of the a-Ni—P alloy film layer by the electric discharge is carried out only at a desired portion on the surface thereof so that crystallized $Ni_xP_y$ and Ni can be locally generated only at the desired portion on the surface of the a-Ni—P alloy film layer.

The electric discharge is carried out by applying a discharge potential between at least one electric discharger positioned opposite to the surface of the substrate of the magnetic hard disk and a metallic table as an electrode which carries the substrate.

The magnetic material layer is adhered on the surface of the substrate (that is, the surface of the a-Ni—P alloy film layer) by a conventional technique such as sputtering and the like.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 1 shows an apparatus for structurally transforming a surface of an a-Ni—P alloy film layer used in an embodiment according to a method of the present invention.

FIGS. 2(a) and 2(b) are additional circuits for connecting to the apparatus shown in FIG. 1. FIG. 2(a) shows a high voltage rectifier circuit, and FIG. 2(b) shows a pulse transformer.

FIG. 3(a) is a microphotograph (×210) of a surface of a substrate of a magnetic hard disk carried out the step of structurally transforming a surface of an a-Ni—P alloy film layer of Example 1 according to the present invention, and FIG. 3(b) is a microphotograph (×210) of a surface of a substrate of a magnetic hard disk carried out the step of structurally transforming a surface of an a-Ni—P alloy film layer by using texture abrasion.

FIG. 4(a) is a microphotograph of a surface of a substrate of a magnetic hard disk carried out the step of structurally transforming a surface of an a-Ni—P alloy film layer of Example 2 according to the present invention, and FIG. 4(b) is a microphotograph of a surface of a substrate of a magnetic hard disk carried out the step of structurally transforming a surface of an a-Ni—P alloy film layer by using a laser beam.

SYMBOLS

10 ... a substrate of a magnetic hard disk
11 ... an electric discharger
12 ... a metallic table
13 ... a variable transformer
14 ... a leakage transformer
15 ... a variable resister
16 ... a high voltage rectifier circuit
17 ... a pulse transformer
18 ... Ni
19 ... $Ni_xP_y$
20 ... a groove
a,b,c,d,e,f,g ... terminals
L ... machine oil or water
P ... a power source
S ... a switch
R ... a rotational direction of a substrate of a magnetic hard disk
T ... a portion where Ni and $Ni_xP_y$ are generated

BEST MODE FOR CARRYING OUT THE INVENTION

A method for manufacturing a magnetic hard disk, in accordance with the present invention, comprises steps of:

(1) structurally transforming a surface of an a-Ni—P alloy film layer formed a substrate of the magnetic hard disk; and (2) adhering a magnetic material layer on a surface of the substrate of the magnetic hard disk, wherein the step of structurally transforming the surface of the a-Ni—P alloy film layer is a step of heating only a desired portion of the surface of the substrate (that is, the surface of the a-Ni—P alloy film layer) by an electric discharge to generate Ni and crystallized $Ni_xP_y$ only at the desired portion of the surface thereof.

In the step of structurally transforming the a-Ni—P alloy film layer, as shouwn in FIG. 1, the electric discharge to the surface of the substrate may be carried out by:

(1) positioning at least one electric discharger 11 opposite to the surface of the substrate 10 carried on a metallic table 12; and (2) applying D.C. voltage, A.C. voltage or a superposed voltage of D.C. and A.C. voltages therebetween to produce an arc-discharge or a spark-discharge.

The electric discharge to the surface of the a-Ni—P alloy film layer is performed by exposing the electric discharger 11 and the substrate 10 of the magnetic hard disk in air or oil, water and the like.

The electric discharger 11 may be made of tungsten, nickel, cobalt, chrome or nichrome.

Crystallized $Ni_xP_y$ and Ni can be generated along a circumferential direction of the surface of the a-Ni—P alloy film layer (as indicated by symbol T shown in FIG. 1) by rotating the substrate 10 of the magnetic hard disk in relative to the electric discharger 11 (in a direction indicated by arrow R in FIG. 1).

In the step of adhering a magnetic material layer, the magnetic material layer can be adhered on the surface of the substrate of the magnetic hard disk (that is, the surface of the a-Ni—P alloy film layer) by a conventional technique such as sputtering.

EXAMPLES

A substrate of a hard disk used for the following examples according to the present invention is made of plating an a-Ni—P alloy on a surface of an aluminium disk to form an a-Ni—P alloy film layer.

An apparatus for structurally transforming a surface of the a-Ni—P alloy film layer is comprised of:

(1) a metallic table 12, which is connected to a means for rotating the table 12 through a shaft, for carrying the substrate 10 thereon; and (2) a electric discharger 11 positioned in opposite to the surface of the substrate 10.

The electric discharger 11 is connected to a secondary side of a leakage transformer 14 via a variable resister 15.

The metallic table 12 as an electrode, which carries the substrate 10, is earthed via the shaft and is connected to the secondary side of the leakage transformer 14.

A primary side of the leakage transformer 14 is connected to a variable transformer 13 and the variable transformer 13 is connected to an electric power source P via switchs S.

The electric power source P is a commercially used electric power source of A.C. 100 V.

The variable transformer 13 can be varied in 0–130 V and can control the voltage input to the primary side of the leakage transformer 14.

The secondary side of the leakage transformer 14 can be varied in 0–20 kV.

The variable resister 15 can precisely control and adjust a current flowing to the electric discharger 11.

When structurally transforming the a-Ni—P film layer by using A.C. voltage, a terminal a is connected to a terminal c and a terminal b is connected to a terminal d in the secondary side of the leakage transformer 14.

Supposing that applying D.C. voltage between the electric discharger 11 and the metallic table 12, a high voltage rectifier circuit 16 shown in FIG. 2(a) is connected to the terminals a, b, c and d of FIG. 1.

Supposing that applying a superposed voltage of D.C. voltage and A.C. voltage, the high voltage rectifier circuit 16 of FIG. 2(a) is connected to the terminals a, b, c and d of FIG. 1 and a pulse transformer 17 shown in FIG. 2(b) is additionally connected to terminals c and e of the high voltage rectifier circuit 16, and A.C. voltage is applied to terminals g and f of the pulse transformer 17.

When D.C voltage or the superposed voltage of D.C. voltage and A.C. voltage is applied between the electric discharger 11 and the metallic table 12, the electric discharger 11 is usually negative and the substrate 10 is earthed as shown in FIG. 1, but alternatively the electric discharger 11 may be positive.

The electric discharge produced between the electric discharger 11 and the surface of the substrate 10 is a spark-discharge or an arc-discharge.

A distance between the electric discharger 11 and the surface of the substrate 10 is adjusted in dependent on an amount of the voltage applied therebetween and is usually about 1 mm.

If an arc-discharge is produced between the electric discharger 11 and the surface of the substrate 10 by applying a low voltage therebetween, then the surface of the substrate 10 can be heated widely and deeply.

If a spark-discharge is produced between the electric discharger 11 and the surface of the substrate 10 by applying a high voltage therebetween, then the surface of the substrate 10 can be heated out narrowly and shallowly.

In a case of the spark-discharge, a path of the electric charge is varied or does not pass a constant path so that an undesired portion of the surface of the substrate 10 may be heated. Thus, in this case, the distance between the electric charger 11 and the surface of the substrate 10 is shorter so that only a desired portion of the surface thereof can be locally heated.

The substrate 10 is rotated in order to generate crystallized $Ni_xP_y$ and Ni on the surface of the substrate 10 in a circumferential direction.

The rotational cycle thereof is in 20-200 rpm.

A temperature of the substrate is rised by the electrical discharge. In particular, in the arc-discharge carried out by applying a low voltage, the substrate becomes in a high temperature, and thus, it is desirable that the electric discharge is carried out by soaking the substrate 10 in a machine oil or water L as shown in FIG. 1.

In practice, in order to reduce the cost for production, it is more desirable that the electric discharge is carried out in air by controlling a voltage applied between the electric discharger 11 and the surface of the substrate 10.

Example 1

In Example 1, a magnetic hard disk is manufactured by:

(1) carrying out the step of structurally transforming an a-Ni—P alloy film layer of the substrate of the magnetic hard disk by using the apparatus for structurally transforming the film layer shown in FIG. 1 in accordance with the method of the present invention; and (2) adhering a magnetic material layer on the surface of the substrate by sputtering.

The electric discharge is performed in air, and A.C. voltage is applied between the electric discharger and the surface of the substrate. The voltage is 15 kV and the current is 20 mA.

A distance between the electric discharger and the surface of the substrate is 1 mm, and the rotational cycle of the substrate is 20 rpm.

FIG. 3(a) is a microphotograph (×210) of a surface of the substrate carried out the step of structurally transforming an a-Ni—P alloy film layer in accordance with the method of the present invention. In the microphotograph, each black spot is Ni having the diameter of about 1.3 µm and is aligned with about 1.0 µm interval. $Ni_5P_4$ and $Ni_3P$ are generated around each Ni.

The height of Ni projected from the surface is about 0.001 µm. This height is 1/300 of the height of irregularities (about 0.3 µm) shown in FIG. 3(b) formed on the surface of the substrate by abrading by a texture processing.

Example 2

In Example 2, a magnetic hard disk is manufactured by:

(1) carrying out the step of structurally transforming an a-Ni—P alloy film layer of the substrate of the magnetic hard disk by using the apparatus for structurally transforming the film layer shown in FIG. 1 and FIG. 2(b) in accordance with the method of the present invention; and (2) adhering a magnetic material layer on the surface of the substrate by sputtering.

The electric discharge is performed in air, and a superposed voltage of D.C. voltage and A.C. voltage are applied between the electric discharger and the metallic table. When this, the applied voltage is a D.C. pulse voltage of about 20 V with 1 ms and the current is 1 A.

The distance between the electric discharger and the surface of the substrate is about 1 mm, and the rotational cycle of the substrate is 20 rpm.

After carrying out the step of structurally transforming an a-Ni—P alloy film layer, on the surface of the substrate of the magnetic hard disk, crystallized $Ni_xP_y$ and Ni having about 10 µm in diameter and about 5 µm in depth are generated (FIG. 4(a)).

FIG. 4(b) is a microphotograph of a surface of the a-Ni—P alloy film layer wherein a laser beam is radiated thereon so that crystallized $Ni_xP_y$ and Ni are generated thereon. The surface is similar to the surface carried out the step of structurally transforming an a-Ni—P alloy film layer of the substrate of the magnetic hard disk in accordance with the method of the present invention.

That is, by the step of structurally transforming a surface of an a-Ni—P alloy film layer in accordance with a method of the present invention, such a surface of a substrate of a magnetic hard disk can be formed by lower cost than that of use of a laser beam.

In CSS (Contact Start and Stop) of a magnetic hard disk and a magnetic head, the magnetic head is contacted with an area on the magnetic hard disk. At this area thereof, the adhesion of a magnetic material layer to the surface of the substrate thereof should be better.

In Example 2 of the present invention, the a-Ni—P alloy film layer at such an area of contact between a magnetic hard disk and a magnetic head can be heated deeply, so that a magnetic material layer can be strongly adhered on the surface of the substrate thereof by sputtering and the like.

We claim:

1. A method for manufacturing a magnetic hard disk comprising steps of:

(1) structurally transforming a surface of a film layer made of an amorphous Ni—P alloy and formed a surface of a substrate of said magnetic hard disk, wherein said step of structurally transforming said surface of said film layer is a step of heating only a desired portion of said surface of said substrate by an electric discharge to generate Ni and crystallized compounds of Ni and P only at said desired portion of said surface; and (2) adhering a magnetic material layer on said surface of said substrate.

2. A method of claim 1 wherein said electric discharge in said step of structurally transforming said surface of said film layer is carried out by applying a discharge potential between at least one electric discharger and a metallic table as an electrode which carries said substrate thereon, said electric discharger being positioned opposite to said surface of said substrate.

3. A method of claim 2 wherein said discharge potential in said step of structurally transforming said surface of said film layer is created by D.C. voltage, A.C. voltage or a superposed voltage of D.C. voltage and A.C. voltage.

* * * * *